No. 842,553. PATENTED JAN. 29, 1907.
M. D. JAYNE.
LUBRICATOR.
APPLICATION FILED SEPT. 6, 1906.
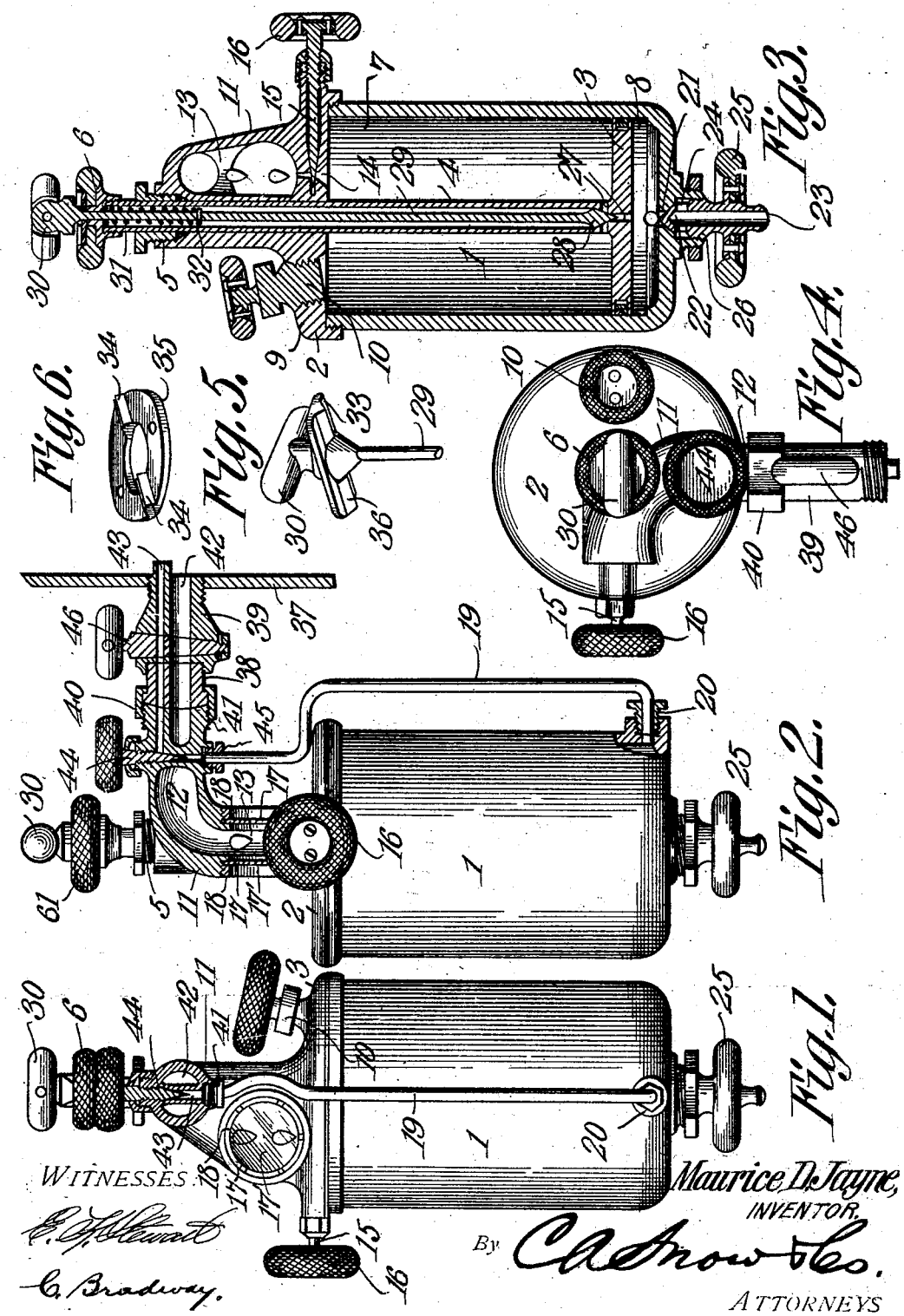
WITNESSES
E. H. Stewart
G. Bradway.
Maurice D. Jayne,
INVENTOR
By C. A. Snow & Co.
ATTORNEYS

UNITED STATES PATENT OFFICE.

MAURICE DECKER JAYNE, OF PHILLIPSBURG, NEW JERSEY.

LUBRICATOR.

No. 842,553.  Specification of Letters Patent.  Patented Jan. 29, 1907.

Application filed September 6, 1906. Serial No. 333,500.

*To all whom it may concern:*

Be it known that I, MAURICE D. JAYNE, a citizen of the United States, residing at Phillipsburg, in the county of Warren and State of New Jersey, have invented a new and useful Lubricator, of which the following is a specification.

This invention relates to a lubricator of that type by which lubricant is fed to a vessel or receptacle having fluid under pressure or to other devices by the fluid in the receptacle acting upon a piston contained in the lubricator, which feeds the lubricant continuously therefrom, such a lubricator being particularly desirable for use with lubricants of any specific gravity and capable of operating reliably under all ordinary changes in temperature.

The invention has for one of its objects to improve and simplify the construction and operation generally of devices of this character, so as to be reliable, efficient, and convenient in service.

A further object of the invention is to provide a novel means for facilitating the drainage and cleaning out of the lubricant and fluid chambers of the lubricator whenever it is desirable.

Another object of the invention is the employment of a simple arrangement of valves and conduits whereby the supply of motive fluid and feed of lubricant can be regulated and whereby the device can be cut into and out of service.

With these objects in view and others, as will appear as the nature of the invention is better understood, the invention comprises the various novel features of construction and arrangement of parts which will be more fully described hereinafter and set forth with particularity in the claims appended hereto.

In the accompanying drawings, which illustrate one of the embodiments of the invention, Figure 1 is a front elevation of the lubricator. Fig. 2 is a side elevation thereof with parts in section. Fig. 3 is a central longitudinal section. Fig. 4 is a plan view. Fig. 5 is a perspective view of the handle end of the valve for draining the lubricant-chamber, showing the cams for holding the valve from its seat. Fig. 6 is a perspective view of the member coöperating with the said valve-opening device shown in Fig. 5.

Corresponding parts in the several figures are indicated throughout by similar characters of reference.

Referring to the drawings, 1 designates the cylindrical casing of the lubricator, which is preferably cast with one end open, so as to permit of the interior being bored cylindrical. The open end is normally closed by a head 2, having a threaded engagement therewith, and mounted for reciprocation in the cylinder is a piston 3, having a stem 4, that projects through the head 2, a stuffing-box 5 being provided at the point where the piston-rod 4 passes through and out of the head. The upper end of the piston-rod 4 is provided with a handhold in the form of a knob 6, having threaded engagement with the piston-rod. so as to be removable therefrom. The piston 3 divides the cylinder into an upper lubricant-containing chamber 7 and a lower steam or other fluid containing chamber 8. The supply of lubricant is admitted to the chamber 7 after the piston has been forced downwardly to its lowermost position through the filling-opening 9 in the head, Fig. 3, which is normally closed by the screw-plug 10. The head 2 is formed with an upwardly-projecting chambered boss 11, that has a rearward extension 12, Fig. 2, with which extension is connected the receptacle or device to be lubricated. The lubricant is fed from the chamber 7 to the sight-chamber 13 through the port 14. The feed through the port is regulated by the needle-valve 15, mounted in the head and provided with a hand-wheel 16 for its actuation. The front and rear walls of the sight-chamber 13 are provided with alining openings 17, as shown more clearly in Fig. 2, that are closed by sight glasses or plates of transparent material, (indicated at 17'.) Retaining-rings 18, having threaded engagement in the said openings, are employed for holding the sight-glasses in place.

The motive fluid, which may be steam, gas, or the like, is admitted to the under side of the piston through a supply-conduit 19, that communicates with the suitable source of fluid. The steam-conduit 19 is removably connected at its lower end to the steam-chamber 8 by means of a fluid-tight connection 20. The steam acting on the under side of the piston urges the same upwardly, so that the lubricant in the chamber 7 is gradually discharged to the devices to be lubricated. In order to drain the steam-chamber 18 of the water of condensation, the bottom head of the cylinder is provided with a drain-hole 21, Fig. 3, which is normally closed by a conical valve 22. The stem of the valve is provided with a central drain-passage 23, with which communicates openings 24, whereby the water from the chamber 8 is run off when the valve 22 is unseated. The stem of the valve 22 is equipped with a hand-wheel 25, whereby the valve can be seated and unseated by screwing in or out on the threads 26. The lubricant-containing chamber 7 is also drained by means of the draining device just described, the said chamber being first drained through a suitably-arranged valve-passage into the steam-chamber 8. For this purpose communication between one side and the other of the piston is had through the passages 27 in the piston-rod and piston. These passages are normally closed by a needle-valve 28, the stem 29 of which extends centrally through the piston-rod, which latter is tubular for this purpose. The upper end of the valve-stem 29 extends through the knob 6 of the piston-rod and is provided with a handhold 30, whereby the valve 28 can be seated or unseated. The valve is normally held on its seat by virtue of a helical compression-spring 31, which at its lower end abuts a collar 32 on the stem and at the upper end abuts on the knob 6. By removing the knob from the piston-rod the drainage-valve 28 can be taken out when desired. In order to hold the drainage-valve 28 off its seat for an indefinite length of time, the handhold 30 or valve-stem 29 is provided with arms 33, which have wedge-shaped cams that are adapted to engage on the raised portions 34 of the washer 35, Figs. 5 and 6. The washer 35 is rigidly secured to the knob 6, and the arms 33, having the cams 36, are so disposed that when the said arms occupy a position between the raised portions 34 the drainage-valve 28 will be seated, and when the cams 36 are moved to engage with and rest on the raised portions the valve will be held open.

As shown in Fig. 2, the lubricator is connected with a steam-pipe or other receptacle containing fluid under pressure, a portion of the pipe being represented at 37. The rearward extension 12 on the head 2 is connected with the pipe 37 by a coupling 38, which at one end has threaded engagement with the cut-out cock 39, which screws into the said steam-pipe. The opposite end of the coupling 38 has a swiveled nut 40, that engages the thread 41 on the rear extension 12. The said extension, coupling 38, and cock 39 are provided with registering bores that form the lubricant-discharging passage 42, which communicates with the sight-chamber 13 and with the pipe 37. Extending through these parts is a steam-conveying passage or conduit 43, through which steam is conveyed to the pipe 19. At the inner end of the steam-passage 43 a controlling needle-valve 44 is provided, whereby the steam supplied to the lubricator is regulated. The upper end of the steam-pipe 19 terminates at the inner end of the steam-passage 43 and is connected with the rear extension 12 by a steam-tight connection 45. When it is desired to detach the lubricator, it is merely necessary to unscrew the swivel-nut 40, and the lubricator, with all its parts intact, can be removed. To take off the head 2, the upper end of the pipe 19 is unfastened from the extension 12, so that the head can then be readily unscrewed and removed from the cylinder, with the piston and the several valves undisturbed and in their operative position. It will thus be seen that the construction shown admits of the parts of the device being readily assembled and disassembled. The cock 39 is fitted with a plug-valve 46, whereby the lubricating device can be entirely cut out of service.

In operation steam is admitted to the under side of the piston by the opening of the valves 44 and 46, and the steam-pressure causes the piston 3 to gradually travel toward the upper end of the cylinder. Lubricant is thus forced out drop by drop through the port 14 and the water of condensation that accumulates in the sight-chamber 13 and thence to the steam-pipe 37. The feed of lubricant can be ascertained through the sight-glasses and then adjusted by the needle-valve 15. When the lubricator is emptied, the supply of steam is cut off and the piston depressed by pushing down on the knob 6. The steam-chamber 8 may then be drained by opening the valve 22. If it is desired to flush out the lubricant-chamber 7, the needle-valve 28 is first opened and then the valve 46. Steam is thus admitted through the passage 42, chamber 13, port 14, to the lubricant-chamber 7. From here the steam passes out from the drainage device and causes the chamber 7 to be thoroughly cleansed. The drainage-valves 28 and 22 are next closed and a new charge of lubricant supplied through the filling-opening 9, which opening after being closed places the device in condition for operation.

What is claimed is—

1. A lubricator comprising a cylinder, a piston therein, means for admitting fluid under pressure to one side of the piston, a conduit for conveying lubricant away from the opposite side of the piston, a valve carried by the piston for permitting the cylinder-space above the piston to be drained, and a common valve controlling the said means and the conduit.

2. A lubricator comprising a cylinder, a head therefor having a boss, a piston within the cylinder, a piston-rod extending through the boss, a sight-chamber at one side of the piston-rod and arranged in the boss, a valve arranged to control the feed through the sight-chamber, means for supplying fluid under pressure to the cylinder, and a fluid-controlling valve arranged on the said head.

3. A lubricator comprising a cylinder, a piston therein having a passage connecting opposite sides of the piston, a piston-rod, a valve in the piston-rod controlling the said passage, and means exterior to the cylinder for actuating the said valve.

4. A lubricator comprising a cylinder, a piston therein, means carried by the piston for draining the space above the latter, and means carried by the cylinder for draining the space below the piston.

5. A lubricator comprising a cylinder, a piston therein, and separate means actuated from a point exterior to the cylinder for draining the chambers on opposite sides of the piston.

6. A lubricator comprising a cylinder, a piston therein having a drainage-passage, a tubular piston-rod, a valve arranged in the rod for controlling the said passage, and a means for yieldingly urging the valve toward its seat.

7. A lubricator comprising a cylinder, a piston therein having a passage, a tubular piston-rod, a valve arranged to control the passage, a stem for the valve extending out of one end of the rod, and means on the outer end of the stem for holding the valve off its seat.

8. A lubricator comprising a cylinder, a piston therein having a passage, a tubular piston-rod, a valve arranged to control the passage, a knob on the rod, a stem for the valve extending through the rod and knob, a spring on the stem for holding the valve closed, and means between the outer end of the valve-stem and the knob for holding the valve off its seat against the tension of the spring.

9. A lubricator comprising a cylinder, a piston therein, a head for the cylinder, a conduit on the head, a steam-pipe connected at its ends with the cylinder and conduit, a valve arranged in the conduit for controlling the supply of steam, a valve carried by the piston for permitting the cylinder-space above the latter to be drained, and a device having separate passages one for the discharge of lubricant and the other for the supply of steam to the conduit.

10. A lubricator comprising a cylinder, a head therefor having a chambered boss and a hollow rearward extension communicating with the chamber of the boss, sight-glasses arranged in the walls of the chamber of the boss, a piston-rod extending through the head, a valve arranged in the head for controlling the feed of lubricant in the cylinder, a pipe extending from the said extension of the head to the cylinder for conveying fluid under pressure thereto, a valve in the extension for controlling the supply of fluid, and separate conduits for conveying fluid to the lubricator and lubricant from the same.

In testimony that I claim the foregoing as my own I have hereto affixed my signature in the presence of two witnesses.

MAURICE DECKER JAYNE.

Witnesses:
 GEO. KAUFMAN,
 GEO. G. LEWIS.